(12) United States Patent
Aoki et al.

(10) Patent No.: US 6,859,704 B2
(45) Date of Patent: Feb. 22, 2005

(54) SELF-ALIGNMENT TORQUE CORRECTING APPARATUS FOR VEHICLE AND ELECTRIC POWER STEERING APPARATUS

(75) Inventors: Kaname Aoki, Yamatokooriyama (JP); Yoichi Nishizawa, Kashihara (JP); Hiroyuki Kondou, Kobe (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/352,247

(22) Filed: Jan. 28, 2003

(65) Prior Publication Data

US 2003/0217885 A1 Nov. 27, 2003

(30) Foreign Application Priority Data

Jan. 31, 2002 (JP) ....................................... 2002-024070

(51) Int. Cl.[7] .............................................. G06F 7/00
(52) U.S. Cl. ............................. 701/41; 701/42; 180/6.2
(58) Field of Search ............................. 701/41, 42, 43; 180/6.2, 6.24, 6.44, 6.6; 340/426.31

(56) References Cited

U.S. PATENT DOCUMENTS 6,445,987 B1 * 9/2002 Kurishige et al. ............ 701/41
6,570,352 B2 * 5/2003 Hara et al. .................. 318/432

FOREIGN PATENT DOCUMENTS

JP 9-207802 8/1997

* cited by examiner

Primary Examiner—Yonel Beaulieu
(74) Attorney, Agent, or Firm—Rabin & Berdo, P.C.

(57) ABSTRACT

A self-alignment torque correcting apparatus for a vehicle that compensates for a surplus and a shortage of self-alignment torque of the vehicle. The apparatus includes a driving source that confers a driving force to a steering mechanism of the vehicle; a steering angle detecting portion that detects a steering angle of an operating member; a vehicle speed detecting portion that detects a speed of the vehicle; and a self-alignment torque compensating portion that compensates for a surplus and a shortage of self-alignment torque of the vehicle by controlling the driving source based on the steering angle detected by the steering angle detecting portion and the vehicle speed detected by the vehicle speed detecting portion.

4 Claims, 3 Drawing Sheets

SELF-ALIGNMENT TORQUE CORRECTING APPARATUS FOR VEHICLE AND ELECTRIC POWER STEERING APPARATUS

BACKGROUND OF THE INVENTION

1. Field of the Invention

The invention relates to an apparatus for correcting self-alignment torque of a vehicle, and to an electric power steering apparatus furnished with a self-alignment torque correcting function.

2. Description of Related Art

The steering mechanism of a vehicle is designed to produce self-alignment torque that forces the self into the straight steering state against a reaction force applied from the road surface. In other words, when the driver moves his hands off the steering wheel while the vehicle is traveling, the vehicle tries to travel in the straight direction. The vehicle characteristic would be ideal if such a traveling characteristic can be achieved in the entire speed range (except for the engine stopped state) and at all the steering angle positions.

However, in some vehicles, when the driver moves his hands off the steering wheel while the vehicle is traveling in a specific speed range (generally, in the low speed range) at a specific steering angle (large steering angle), the steering mechanism is not forced into the straight steering state; on the contrary, it is steered to the right or the left fully to the limit.

For example, as shown in FIG. 3, the self-alignment torque takes a positive value (in the direction forcing the steering mechanism into the straight steering state) in the high and medium speed ranges at all the steering angle positions, whereas the self-alignment torque may take a negative value in the low and extremely low speed ranges at large steering angles.

According to one of the related-art self-alignment torque correcting techniques, a spring is linked to the rack axis and the steering mechanism is returned to the straight steering state by a force of the spring. However, because the ability of a vehicle to travel in the straight direction is maintained by a force of the spring regardless of the speed range, in the case of a vehicle having a problem in the ability to travel in the straight direction only in a specific speed range, the self-alignment torque may be corrected as well in the other speed ranges that need no correction.

In addition, a problem in the aforementioned related-art technique that corrects the self-alignment torque mechanically is that because the self-alignment torque correcting structure using a spring has to be designed differently for each type of vehicle, the number of man-hours needed to develop the structure is increased markedly.

SUMMARY OF THE INVENTION

The object of the invention is to provide a self-alignment torque correcting apparatus for a vehicle capable of readily correcting the self-alignment torque.

Another object of the invention is to provide an electric power steering apparatus furnished with a self-alignment torque correcting function.

A self-alignment torque correcting apparatus for a vehicle of the invention includes: a driving source that confers a driving force to a steering mechanism of the vehicle; a steering angle detecting portion that detects a steering angle of an operating member; a vehicle speed detecting portion that detects a speed of the vehicle; and a self-alignment torque compensating portion that compensates for a surplus and a shortage of self-alignment torque of the vehicle by controlling the driving source based on the steering angle detected by the steering angle detecting portion and the vehicle speed detected by the vehicle speed detecting portion.

According to the above arrangement, the surplus and the shortage of the self-alignment torque can be compensated electrically by detecting the steering angle and the speed and controlling the driving source based on these detected values. It is thus possible to, for example, correct the self-alignment torque only in a specific speed range or in a specific steering angle range.

Moreover, different from mechanical correcting means, the need to consider the structure of the steering mechanism for each type of vehicle can be eliminated. Hence, the self-alignment torque can be readily corrected and the number of man-hours needed to develop the steering mechanism can be reduced.

Also, because the self-alignment torque can be corrected electrically, the mechanical design of the steering mechanism becomes easier, which increases the degree of freedom. For example, because a change in the self-alignment torque caused by displacement of the rack position can be compensated electrically, the steering mechanism can be developed and designed while allowing more flexible settings as to the rack position than were allowed conventionally.

To be more specific, when the chassis is designed so as to produce the self-alignment torque, which is a force that returns the steering wheel at the neutral position, as with the conventional vehicle, restrictions are imposed as to various factors of the suspension, the mounting position of the steering gear, the design of the mechanism, etc. All those restrictions, however, can be relaxed by the invention.

Also, an electric power steering apparatus of the invention is an electric power steering apparatus for assisting steering by transmitting a driving force of an electric motor to a steering mechanism of a vehicle, which includes: a steering angle detecting portion that detects a steering angle of an operating member; a vehicle speed detecting portion that detects a speed of the vehicle; a driving target value setting portion that sets a driving target value of the electric motor; a self-alignment torque compensating portion that compensates for a surplus and a shortage of self-alignment torque of the vehicle by correcting the driving target value set by the driving target value setting portion, based on the steering angle detected by the steering angle detecting portion and the vehicle speed detected by the vehicle speed detecting portion; and a motor driving portion that drives the electric motor based on the driving target value corrected by the self-alignment torque compensating portion.

According to the above arrangement, the self-alignment torque compensating function can be furnished to an electric power steering apparatus. It is thus possible to achieve the foregoing advantages while utilizing the existing electrical machinery and equipment.

The self-alignment torque compensating portion may include: a storage portion that stores a self-alignment torque correction characteristic corresponding to the vehicle speed; a storage portion that stores a self-alignment torque correction characteristic corresponding to the steering angle; and means for correcting the driving target value based on the characteristics stored in the respective storage portions.

The above and other objects, features, and advantages of the invention will become more apparent from the following description of embodiments with reference to the accompanying drawings.

DESCRIPTION OF THE PREFERRED EMBODIMENTS

Figure 1:
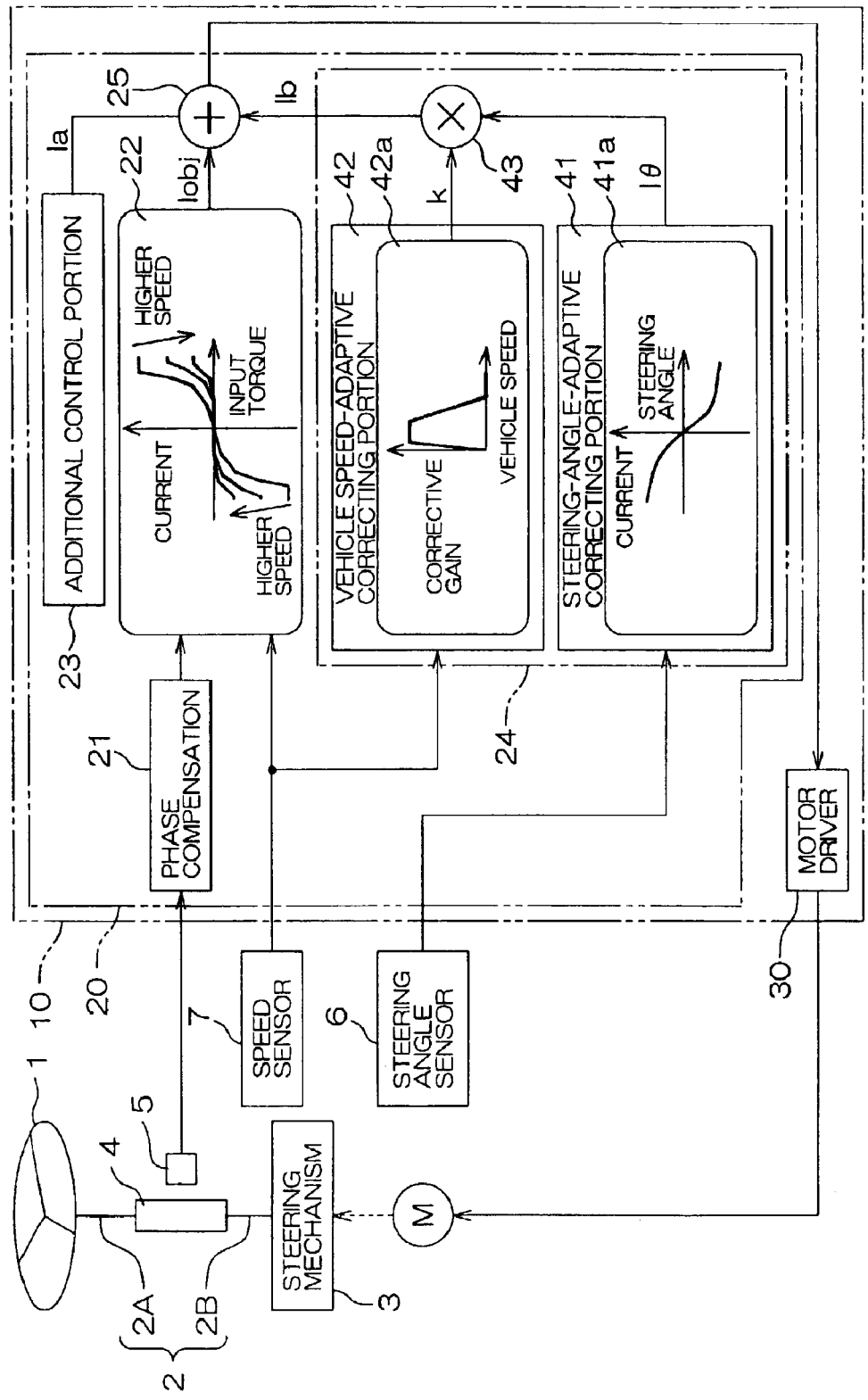
FIG. 1 is a block diagram depicting an electrical arrangement of an electric power steering apparatus according to one embodiment of the invention.

FIG. 1 is a block diagram depicting an electrical arrangement of an electric power steering apparatus according to one embodiment of the invention. Steering torque applied to a steering wheel 1 serving as an operating member is transmitted mechanically to a steering mechanism 3 through a steering shaft 2. A steering assisting force from an electric motor M is also transmitted to the steering mechanism 3.

The steering shaft 2 is divided into an input axis 2A linked to the steering wheel 1 and an output axis 2B linked to the steering mechanism 3. These input axis 2A and the output axis 2B are coupled to each other through a torsion bar 4. On the torsion bar 4, torsion is caused in response to the steering torque, and a torque sensor 5 detects the direction and quantity of the torsion.

The torque sensor 5 is composed of, for example, a magnetic sensor designed to detect magnetic-resistance that varies with a change in the positional relation between the input axis 2A and the output axis 2B in their respective rotational directions. An output signal from the torque sensor 5 is inputted into a controller 10 (ECU).

The controller 10 also receives output signals respectively from a steering angle sensor 6 that detects the steering angle of the steering wheel 1 and a speed sensor 7 that detects the speed of the vehicle on which the electric power steering apparatus is mounted.

The controller 10 sets an target current value of the electric motor M in response to the steering torque detected by the torque sensor 5 and the speed detected by the speed sensor 7, and drives the electric motor M under control so that a steering assisting force corresponding to the steering torque or the like is conferred to the steering mechanism 3.

The controller 10 includes a microcomputer 20, and a motor driver 30 that drives the electric motor M based on a control signal from the microcomputer 20.

The microcomputer 20 substantially includes a plurality of functional processing portions achieved by running a program. To be more specific, the microcomputer 20 includes: a phase compensating portion 21 that stabilizes the system by advancing the phase of an output signal from the torque sensor 5; an target current value setting portion 22 that sets the target current value Iobj of the electric motor M based on outputs from the torque sensor 5 and the speed sensor 7; an additional control portion 23 that generates a corrective value Ia used for additional control; a self-alignment torque correction control portion 24 that generates a corrective value Ib used in compensating for the self-alignment torque of the vehicle on which is mounted the electric power steering apparatus; and an addition processing portion 25 that adds the corrective values Ia and Ib to the target current value Iobj.

The additional control portion 23 generates the corrective value Ia used for damping control, frictional compensation control, inertial compensation control, steering wheel return control, etc.

The self-alignment torque correction control portion 24 includes: a steering-angle-adaptive correcting portion 41 that generates a corrective current $I\theta$ corresponding to the steering angle detected by the steering angle sensor 6; a speed-adaptive correcting portion 42 that generates a corrective gain k corresponding to the speed detected by the speed sensor 7; and a multiplication processing portion 43 that computes the corrective value $Ib = k \cdot I\theta$ by multiplying the corrective current $I\theta$ generated in the steering-angle-adaptive correcting portion 41 by the corrective gain k generated in the speed-adaptive correcting portion 42.

The steering-angle-adaptive correcting portion 41 includes a steering-angle-adaptive correction characteristic storage portion 41a that stores the characteristic of the corrective current $I\theta$ with respect to the steering angle. Likewise, the speed-adaptive correcting portion 42 includes a speed-adaptive correction characteristic storage portion 42a that stores the characteristic of the corrective gain k with respect to the speed. The steering-angle-adaptive correcting portion 41 and the speed-adaptive correcting portion 42 generate the corrective current $I\theta$ and the corrective gain k corresponding to the steering angle and the speed, respectively, by reading out these values from the steering-angle-adaptive correction characteristic storage portion 41a and the speed-adaptive correction characteristic storage portion 42a, respectively.

In regard to the steering torque, for example, a positive value is given to the torque needed to steer to the right, and a negative value is given to the torque needed to steer to the left. The target current value Iobj set by the target current value setting portion 22 is set to a positive value when the electric motor M generates a steering assisting force needed to steer to the right, and set to a negative value when the electric motor M generates a steering assisting force needed to steer to the left.

The target current value Iobj takes a positive value when the steering torque is given with a positive value, and takes a negative value when the steering torque is given with a negative value. The target current value Iobj is set to 0 (zero) when the steering torque takes a minimal value within a certain dead zone. The target current value Iobj is set so that the absolute value thereof becomes smaller as the speed detected by the speed sensor 7 becomes higher. It is thus possible to generate a large steering assisting force during the low speed traveling, and to reduce the steering assisting force during the high speed traveling.

The steering-angle-adaptive correction characteristic storage portion 41a stores characteristic data determined adequately according to the type of vehicle through experiments, for example. In the case of FIG. 1, a negative corrective current $I\theta$ is corresponded to the steering angle of a positive value (in a state when steered to the right from the center of the steering angle), and a positive corrective current $I\theta$ is corresponded to the steering angle of a negative value (in a state when steered to the left from the center of the steering angle). Consequently, correction corresponding to the direction of torque needed to force the steering mechanism 3 into the straight steering state is achieved.

The speed-adaptive correction characteristic storage portion 42a also stores characteristic data determined adequately according to the type of vehicle through experiments, for example. In the case of FIG. 1, the corrective gain k is greater in the extremely low (except for the engine stopped state) and low speed ranges, and the corrective gain k is reduced to almost 0 in the medium and high speed ranges. Consequently, in the extremely low and low speed ranges, the corrective current Iθ contributes significantly to the corrected target current value Iobj, which heightens a tendency to return the steering mechanism 3 to the straight steering state. Conversely, in the medium and high speed ranges, the contribution of the corrective current Iθ is lessened, and the self-alignment torque against a reaction force applied from the road surface is conferred to the steering mechanism 3 according to the intrinsic characteristic of the steering mechanism 3.

Figure 2:
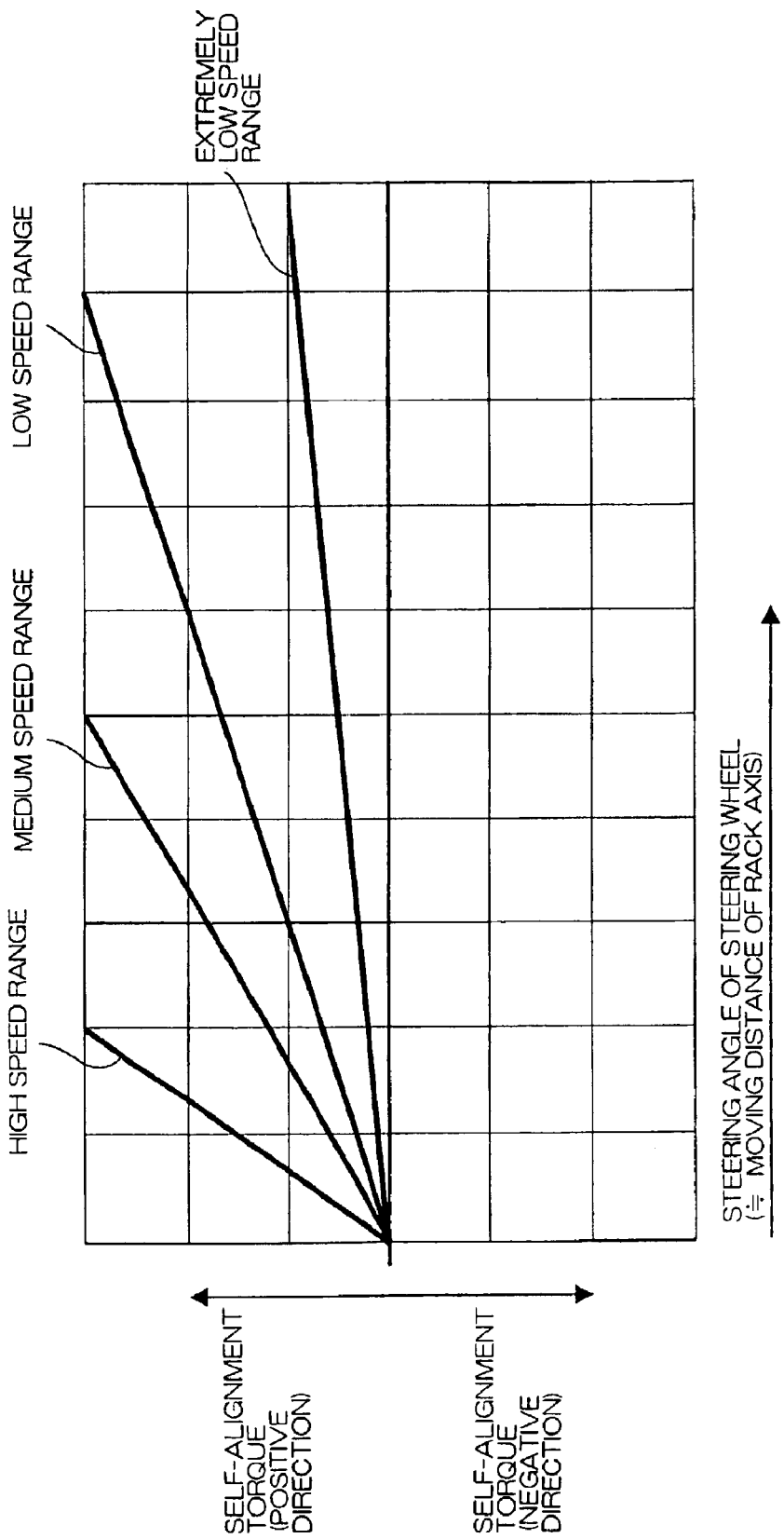
FIG. 2 is a view showing a torque characteristic when the self-alignment torque against a reaction force applied from the road surface is synthesized with torque generated with a corrective value from a self-alignment torque correction control portion.
Figure 3:
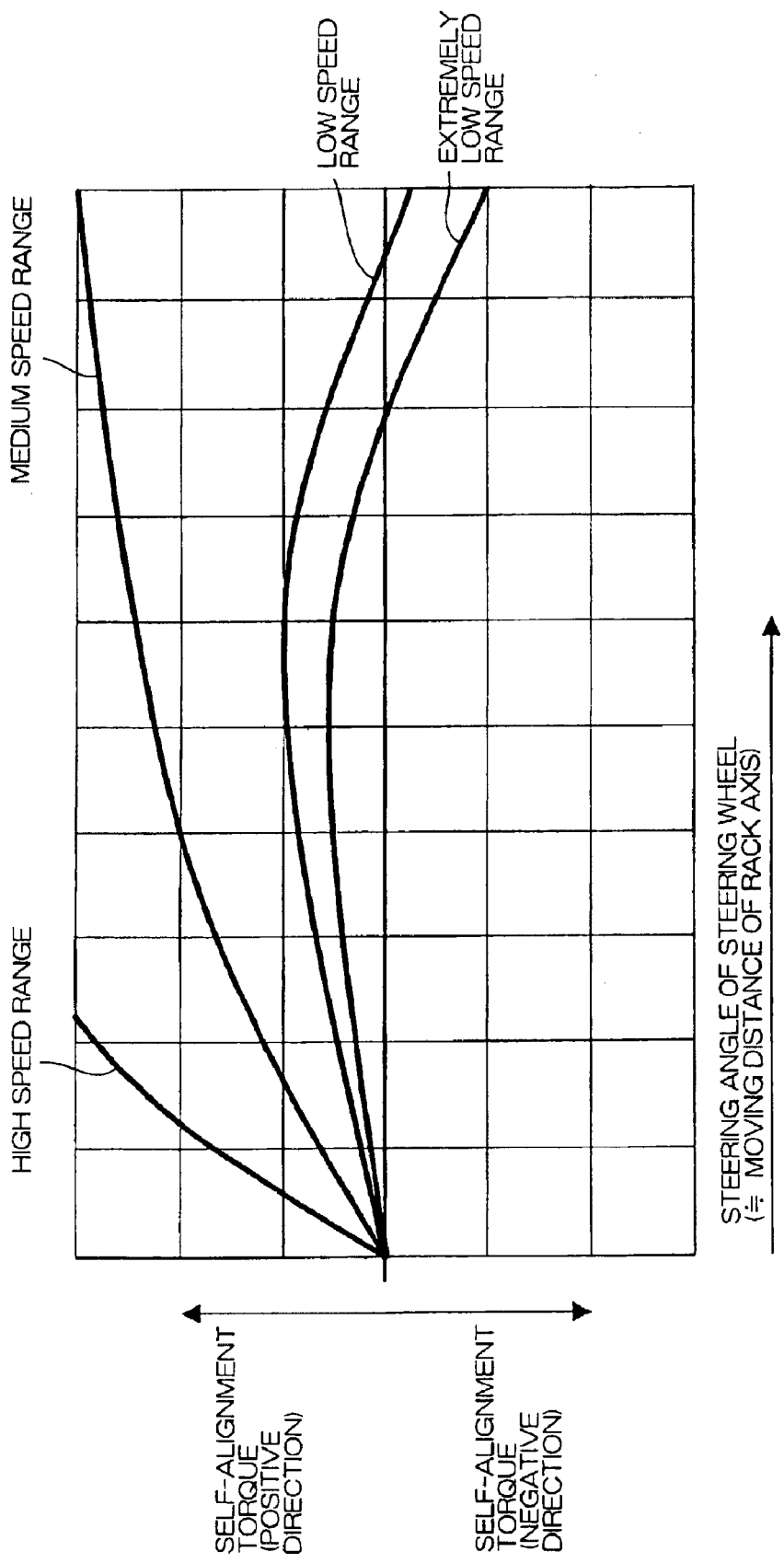
FIG. 3 is a view showing an example of a characteristic of self-alignment torque against a reaction force applied from the road surface.

FIG. 2 is a view showing a torque characteristic when the self-alignment torque against a reaction force applied from the road surface is synthesized with torque generated with the corrective value Ib from the self-alignment torque correction control portion 24. It is revealed that a satisfactory self-alignment torque characteristic can be achieved, according to which the self-alignment torque increases linearly with respect to a given steering angle in any of the high, medium, low, and extremely low speed ranges. In other words, even with a vehicle having the self-alignment torque characteristic as shown in FIG. 3, a surplus and a shortage of the self-alignment torque is compensated through electrical correction by the self-alignment torque correction control portion 24, thereby making it possible to correct the vehicle characteristic to the ideal self-alignment torque characteristic.

In this manner, even when a vehicle is originally given with a poor ability to travel in the straight direction, the ability can be enhanced to the extent that the vehicle is able to travel in the straight direction in a natural manner. Also, the self-alignment torque can be corrected by a large quantity in the speed range or the steering angle range where the ability to travel in the straight direction becomes poor, whereas the quantity of correction can be lessened in the speed range or the steering angle range where the satisfactory ability to travel in the straight direction is maintained.

A description has been given to one embodiment of the invention. It should be appreciated, however, that the invention can be implemented in other ways. For example, in the embodiment above, it is the target current value Iobj set by the target current setting portion 22 that is corrected in response to the steering angle and the speed, so that the corrected target current value Iobj is used to compensate for the surplus and the shortage of the self-alignment torque. Alternatively, it may be the torque value inputted into the target current value setting portion 22 that is corrected in response to the steering angle and the speed, for example, so that the target current value Iobj is corrected and used to compensate for the surplus and the shortage of the self-alignment torque.

Also, the embodiment above explained a case where the self-alignment torque characteristic for a vehicle is corrected electrically using the electric motor M in the electric power steering apparatus as the driving source. However, another driving source may be provided besides the one in the electric power steering apparatus, so that the self-alignment torque characteristic is improved by controlling the additionally provided driving source.

The foregoing description described embodiments of the invention in detail. It should be appreciated, however, that these embodiments represent examples to provide clear understanding of the technical contents of the invention, and the invention is not limited to these examples. The sprit and the scope of the invention, therefore, are limited solely by the appended claims.

The present application corresponds to Japanese Patent Application No. 2002-24070 filed with Japanese Patent Office on Jan. 31, 2002, the entire content of which is hereby incorporated by reference.

What is claimed is:

1. A self-alignment torque correcting apparatus for a vehicle, comprising:

a driving source that confers a driving force to a steering mechanism of the vehicle;

a steering angle detecting portion that detects a steering angle of an operating member;

a vehicle speed detecting portion that detects a speed of the vehicle; and a self-alignment torque compensating portion that compensates for a surplus and a shortage of self-alignment torque of the vehicle by controlling the driving source based on the steering angle detected by the steering angle detecting portion and the vehicle speed detected by the vehicle speed detecting portion, the self-alignment torque compensating portion including:

a steering-angle-adaptive correcting portion that generates a steering-angle-adaptive corrective value corresponding to the steering angle detected by the steering angle detecting portion;

a vehicle-speed-adaptive correcting portion that generates a corrective gain corresponding to the vehicle speed detected by the vehicle speed detecting portion; and a multiplication processing portion that computes a corrective value by multiplying the steering-angle-adaptive corrective value generated in the steering-angle-adaptive correcting portion by the corrective gain generated in the vehicle-speed-adaptive correcting portion, wherein the self-alignment torque compensating portion compensates for the surplus and the shortage of the self-alignment torque of the vehicle by controlling the driving source based on the corrective value computed in the multiplication processing portion.

2. The self-alignment torque correcting apparatus for a vehicle according to claim 1, wherein the self-alignment torque compensating portion includes:

a storage portion that stores a self-alignment torque correction characteristic corresponding to the vehicle speed; and a storage portion that stores a self-alignment torque correction characteristic corresponding to the steering angle, and wherein the self-alignment torque compensating portion compensates for the surplus and the shortage of the self-alignment torque of the vehicle by controlling the driving source based on the characteristics stored in the respective storage portions.

3. An electric power steering apparatus for assisting steering by transmitting a driving force of an electric motor to a steering mechanism of a vehicle, comprising:

a steering angle detecting portion that detects a steering angle of an operating member;

a vehicle speed detecting portion that detects a speed of the vehicle;

a driving target value setting portion that sets a driving target value of the electric motor;

a self-alignment torque compensating portion that compensates for a surplus and a shortage of self-alignment torque of the vehicle by correcting the driving target value set by the driving target value setting portion, based on the steering angle detected by the steering angle detecting portion and the vehicle speed detected by the vehicle speed detecting portion, the self-alignment torque compensating portion including:

a steering-angle-adaptive correcting portion that generates a steering-angle-adaptive corrective value corresponding to the steering angle detected by the steering angle detecting portion;

a vehicle-speed-adaptive correcting portion that generates a corrective gain corresponding to the vehicle speed detected by the vehicle speed detecting portion;

a multiplication processing portion that computes a corrective value by multiplying the steering-angle-adaptive corrective value generated in the steering-angle-adaptive correcting portion by the corrective gain generated in the vehicle-speed-adaptive correcting portion; and a driving target value correcting portion that corrects the driving target value set by the driving target value setting portion based on the corrective value computed in the multiplication processing portion; and a motor driving portion that drives the electric motor based on the driving target value corrected by the self-alignment torque compensating portion.

4. The electric power steering apparatus according to claim 3, wherein the self-alignment torque compensating portion includes:

a storage portion that stores a self-alignment torque correction characteristic corresponding to the vehicle speed;

a storage portion that stores a self-alignment torque correction characteristic corresponding to the steering angle; and a driving target value correcting portion that corrects the driving target value set by the driving target value setting portion based on the characteristics stored in the respective storage portions.

\* \* \* \* \*